United States Patent
Arnet et al.

(10) Patent No.: US 6,768,621 B2
(45) Date of Patent: Jul. 27, 2004

(54) CONTACTOR FEEDBACK AND PRECHARGE/DISCHARGE CIRCUIT

(75) Inventors: Beat J. Arnet, Winchester, MA (US); Kevin Amundsen, Marstons Mills, MA (US)

(73) Assignee: Solectria Corporation, Woburn, MA (US)

( * ) Notice: Subject to any disclaimer, the term of this patent is extended or adjusted under 35 U.S.C. 154(b) by 115 days.

(21) Appl. No.: 10/054,606

(22) Filed: Jan. 18, 2002

(65) Prior Publication Data

US 2003/0137791 A1 Jul. 24, 2003

(51) Int. Cl.$^7$ .................................................. H02H 3/00
(52) U.S. Cl. ......................................................... 361/93.1
(58) Field of Search ............................... 361/79, 86, 87, 361/93.9, 94, 100, 101, 105, 115, 160, 163, 170; 307/113, 116, 125, 130, 131

(56) References Cited

U.S. PATENT DOCUMENTS

| | | | |
|---|---|---|---|
| 4,025,820 A | | 5/1977 | Penrod |
| 4,772,809 A | | 9/1988 | Koga et al. |
| 4,855,612 A | | 8/1989 | Koga et al. |
| 5,309,068 A | | 5/1994 | Hakkarainen et al. |
| 5,590,013 A | * | 12/1996 | Harasawa ................. 361/187 |
| 5,633,540 A | | 5/1997 | Moan |
| 5,668,706 A | | 9/1997 | Sakai et al. |
| 5,814,955 A | | 9/1998 | Bauer et al. |
| 6,054,891 A | * | 4/2000 | Christiansen ............. 327/438 |
| 6,078,160 A | * | 6/2000 | Cilluffo ..................... 318/641 |
| 6,091,223 A | * | 7/2000 | Rogers et al. ............. 320/111 |

* cited by examiner

*Primary Examiner*—Matthew V. Nguyen
(74) *Attorney, Agent, or Firm*—Mintz, Levin, Cohn, Ferris, Glovsky & Popeo, P.C.

(57) ABSTRACT

A contactor feedback and pre-charge circuit is disclosed that is capable of i) precharging a load to control the inrush of current, ii) discharging the load to eliminate the risk of shock due to capacitive charge, and iii) shutting the system down in the event the contactor unintentionally opens during operation.

6 Claims, 5 Drawing Sheets

CONTACTOR FEEDBACK AND PRECHARGE/DISCHARGE CIRCUIT

FIELD OF THE INVENTION

The present invention relates to circuits for controlling a contactor coupled to loads that may hold a permanent charge, and more particularly to a circuit for safely connecting and disconnecting the load.

BACKGROUND OF THE INVENTION

In power systems, a main contactor is often used to connect and disconnect loads that hold a permanent charge, for example battery packs or super capacitors, from the power bus. Deenergizing the power bus eliminates the risk of accidents, including physical injury, when the system is left unsupervised or when the system needs to be maintained, repaired, assembled, or dissembled. Ideally, the contactor is often located as close to the power source as possible to minimize the portion of the system that remains "live".

When connecting a power source to an uncharged capacitive load, the contactors are subjected to large inrush currents when the contactor first closes. This temporary current surge can be problematic as the size of the load controlled by a single contactor increases. Though the inrush may be short-lived, this level of surge can wreak havoc on the contacts of even a relatively large relay having a high current rating.

Existing power systems address the problem described above by using a single heavy-duty relay having large contacts. But contactors of this type tend to be both costly and bulky in size.

Another approach is to use two relatively small relays connected in parallel, with one having a current-limiting resistive element in series therewith. Such a switching circuit is shown in FIG. 1. In operation, relay RL1 is closed for a short time while relay RL2 remains open. As relay RL1 closes, current from the power source rushes through the resistor R to charge up the capacitive load. The opening and closing of the contactors in these systems is based on time or mechanical design. Typically, after a predetermined time, RL2 is closed.

Other solutions, as shown in FIG. 2, use a hybrid switching circuit, which combines a relay of the type having two sets of contacts, and a semiconductor switch, such as a triac. This circuit operates as follows: When an input signal is applied to the relay, the contacts A close first, thereby causing current to immediately flow through resistor R to the gate lead of triac Q. Upon triggering the triac, current flows from the power source to the load, through the triac. After a predetermined time period, the B contacts close, allowing load current to flow unimpeded from the source to the load. At this point, both sets of relay contacts are closed. When the input signal is removed, the B contacts open first, thereby causing load current to again flow in the triac. Subsequently, when the contacts A open, the load current becomes zero and is cut off by the triac.

Another switching circuit, as shown in FIG. 3, comprises a pair of relays RL3 and RL4, preferably connected in parallel, with one of such relays having a controllably conductive device, such as an electronic switch, and preferably a triac Q1, connected in series therewith. With the relays RL3 and RL4 open, an air gap isolates the power source and the load. In closing the relays in sequence, relay RL3 provides a conductive path from the power source to the triac Q1. After a delay, the triac is triggered to provide a conductive path from the power source to the load, and a large current surge (as much as 300 amps) flows to the load, for example an electronic fluorescent ballast with a capacitive front end. After a predetermined period of time, the other relay RL4 is closed to provide a direct conductive path between the power source and ballasts. Subsequently, RL3 may be reopened.

In power systems that do not have a main contactor, the load itself typically incorporates the contactor for connecting and disconnecting the load and controlling inrush currents.

Thus, existing circuits often have a controller circuit or mechanical design that relies on a fixed or variable time period to open or close the contactors. However, the fixed or variable time period may not correspond to the appropriate time to open or close the contactors.

Another problem associated with contactors coupled to loads is that, should the contactor open during operation, the system must be shut down quickly in order to avoid under or over voltages at the loads as well as arching at the contactor. In order to safely shut down the system there needs to be a circuit that can detect if the contactor has unintentionally opened.

Another problem associated with contactors coupled to capacitive loads is how to safely discharge the load so maintenance personnel can safely maintain, repair, assemble, or dissemble the system. In order to safely discharge the load, a path needs to be created in order to bleed away the stored charge.

It would be desirable to provide a contactor control circuit that can overcome the above-mentioned shortcomings.

SUMMARY OF THE INVENTION

In view of the foregoing discussion, an object of this invention is to provide a contactor control circuit that is capable i) of pre-charging the loads to control the inrush of current, ii) discharging the load to eliminate the risk of shock due to capacitive charge, and iii) shutting the system down in the event the contactor unintentionally opens during operation.

It is a further object of the invention to provide a circuit for coupling a power source to a load. The circuit comprising a main contactor coupled in series with the power source and the load and a detector circuit coupled to a conductive path in parallel with the main contactor, the detector circuit configured to detect the flow of current through the conductive path.

It is a further object of the invention to provide a circuit for coupling a power source to a load. The circuit comprising a main contactor coupled in series with the power source and the load, the main contactor operable in a conductive state and a nonconductive state, a pre-charge circuit coupled in parallel with the main contactor, the precharge circuit outputting a signal indicative of the current passing through the pre-charge circuit, and a controller circuit for controlling the state of the main contactor based on the signal from the pre-charge circuit.

It is a further object of the invention to provide a circuit for coupling a power source to a load. The circuit comprising a main contactor coupled in series with the power source and the load, a pre-charge circuit coupled in parallel with the main contactor, the pre-charge circuit comprising a current limiting element and a controller circuit for controlling the opening of the main contactor based on a voltage drop across the current limiting element.

It is a further object of the invention to provide a circuit for coupling a power source to a load. The circuit comprising a main contactor coupled in series with the power source and the load, a pre-charge circuit comprising a first conductive path coupled in parallel with the main contactor, a discharge circuit comprising a second conductive path coupled in parallel with the load, and a controller circuit for controlling the opening of the main contactor based on a current through the first conductive path.

It is a further object of the invention to provide a system comprising a power source, a load, a main contactor coupled in series with the power source and the load and a detector circuit coupled to a conductive path in parallel with the main contactor, the detector circuit configured to detect the flow of current through the conductive path.

BRIEF DESCRIPTION OF THE DRAWINGS

For a better understanding of the present invention, together with other objects, features and advantages, reference should be made to the following Description of the Invention which should be read in conjunction with the following figures wherein like numerals represent like parts, and wherein.

DETAILED DESCRIPTION OF THE INVENTION

Figure 1:
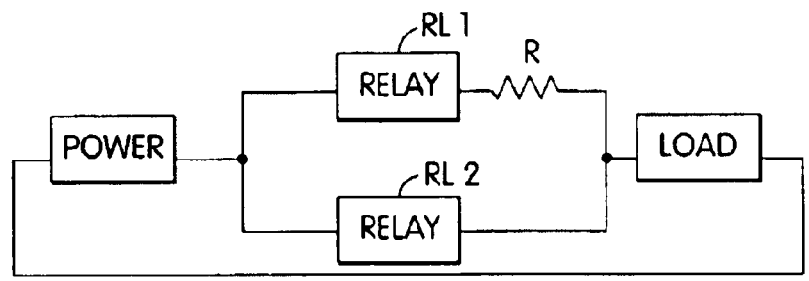
FIGS. 1, 2, and 3 are electrical schematics of prior art switching circuits.
Figure 2:
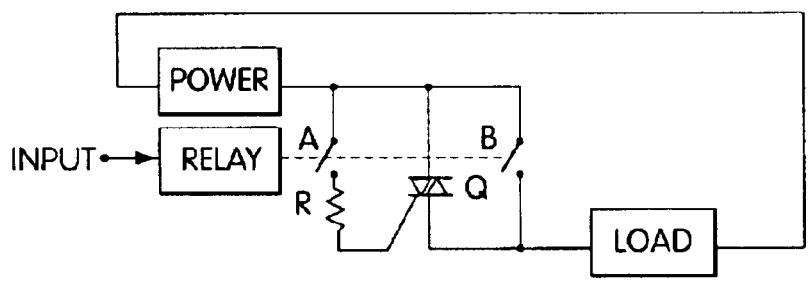
Figure 3:
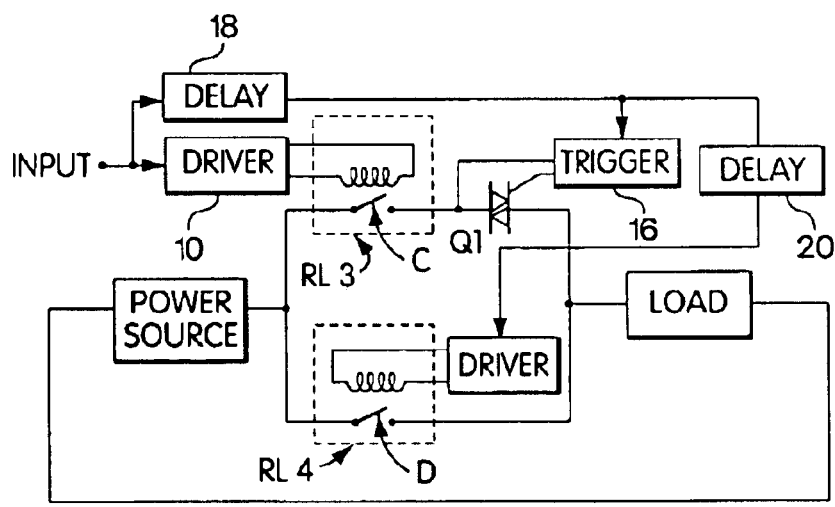
Figure 4:
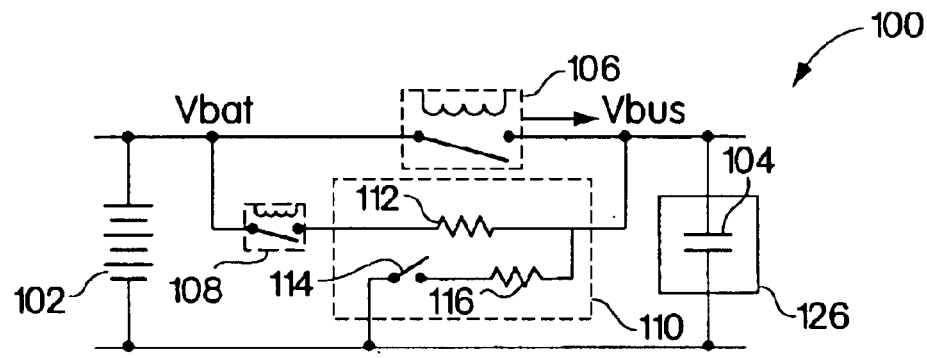
FIG. 4 is a block diagram of a power system with a pre-charge and discharge circuit consistent with the present invention disposed between a power source and a load component.

FIG. 4 shows a block diagram of a power system 100 comprising a main contactor 106 coupled in series between a power source 102 and a load component 126. The load component 126 may be e.g. a capacitive power stage 104. The main contactor 106 is shown as a relay. Alternatively, the main contactor 106 may be any controllable conductive device, for example a manual switch or semiconductor device, for example a triac, two anti-parallel silicon controlled rectifiers (SCRs), an insulated gate bipolar transistor (IGBT), a FET, or a MOSFET. The power source 102 is shown as a DC power source, but may be any power source including, but not limited to, a battery, a supercapacitor, a fuel cell, or a rectified AC source. An auxiliary contactor 108 is coupled to a pre-charge and discharge circuit 110. The auxiliary contactor 108 and precharge and discharge circuit 110 are coupled in parallel with the main contactor 106. The auxiliary contactor 108 is shown as a relay. Alternatively, the auxiliary contactor 108 may be any controllable conductive device, for example a manual switch or semiconductor device, for example a triac, two anti-parallel SCRs, IGBT, FET, or MOSFET. The pre-charge and discharge circuit 110 may comprise a resistor or PTC 112.

A controller circuit, for example a timing circuit, voltage sensor, or microcontroller can control the opening and closing of the main contactor 106 and the auxiliary contactor 108. The main contactor 106 and the auxiliary contactor 108 may be capable of generating feedback signals for processing by the controller circuit. Alternatively, the controller circuit can control the conduction or non-conduction of the semiconductor devices. Opening the main contactor 106 and the auxiliary contactor 108 disconnects the load component 104 from the power source 102. To energize the load component 104, the controller first closes the auxiliary contactor 108 to pre-charge the capacitive power stage in the load component 104. When the bus voltage comes within a predetermined range of the power supply voltage, the controller then closes the main contactor 106. The pre-charge and discharge circuit 110 may also include a controllable switch 114 and a current limiting element 116, for example a resistor or PTC to allow the capacitive power stage of the load component to be discharged when the main contactor 106 is open. The controllable switch 114 and the current limiting element 116 are coupled in parallel with the load component 104.

Incorporating a feedback signal of a commercially available contactor can be unreliable because such contactor feedback signals are based on auxiliary switches, which might fail or not follow the main switch. An alternative embodiment as illustrated in FIG. 5 actually eliminates the need for a feedback signal from the contactor.

Figure 5:
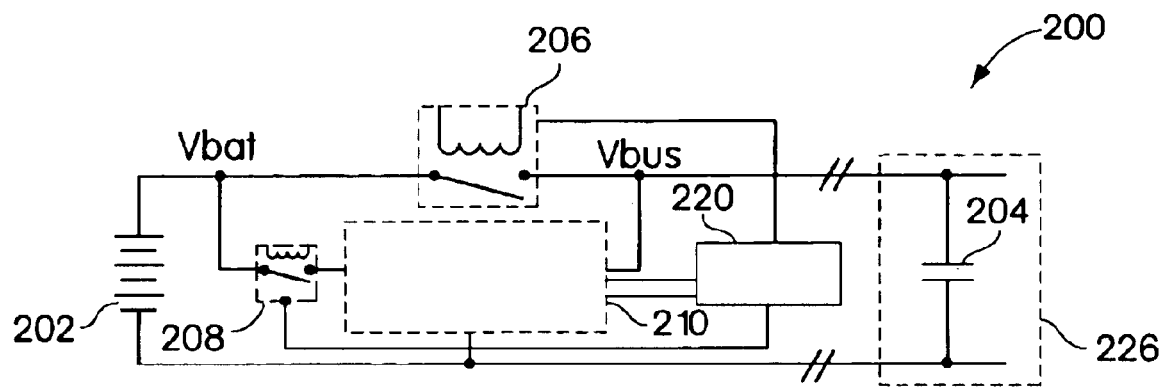
FIG. 5 is a block diagram of a power system with a contactor feedback and precharge and discharge circuit consistent with the present invention disposed between a power source and a load component.
Figure 8:
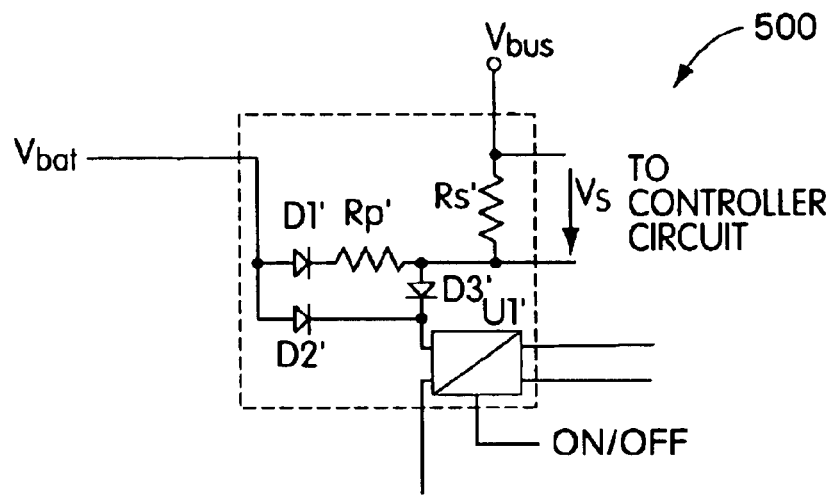
Figure 9:
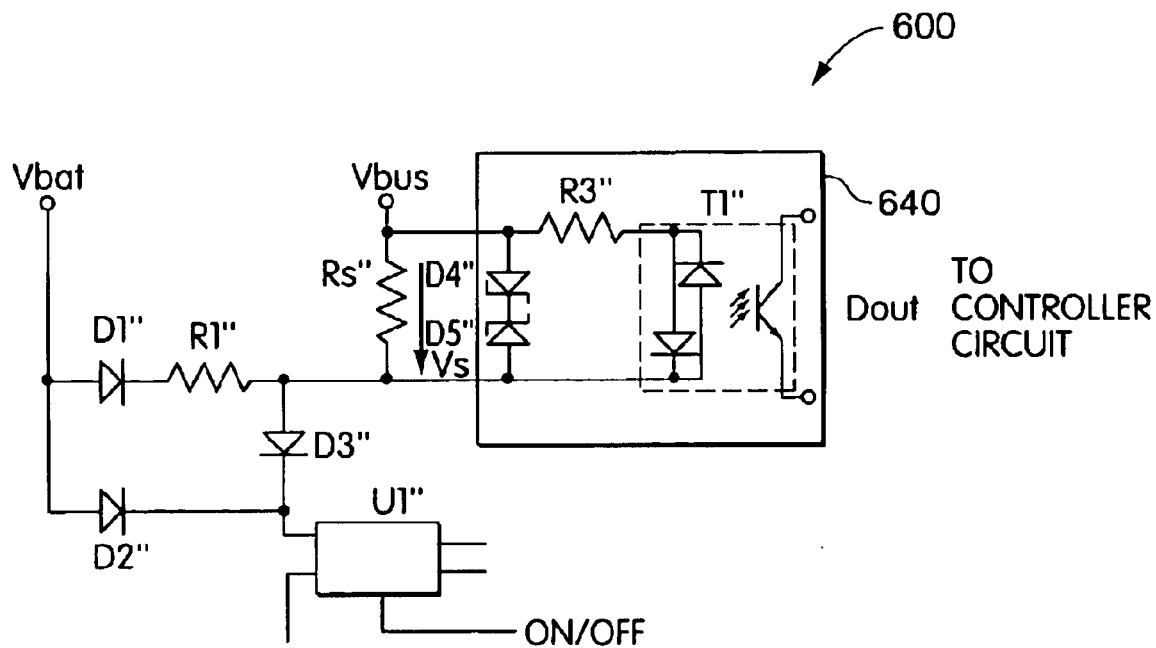
FIG. 9 is an electrical schematic of a third embodiment contactor feedback and pre-charge and discharge circuit consistent with the present invention.

FIG. 5 shows a power system 200 comprising a main contactor 206 coupled in series between a power source 202 and a load component 226. The main contactor 206 is shown as a relay. Alternatively, the main contactor 206 may be any controllable conductive device, for example a manual switch or semiconductor device, for example a triac, two anti-parallel SCRs, IGBT, FET, or MOSFET. The power source 202 may be a DC power source. The load component 226 may comprise a capacitive power stage 204. An auxiliary contactor 208 may be coupled to a contactor feedback and pre-charge and discharge circuit 210. The auxiliary contactor is shown as a relay. Alternatively, the auxiliary contactor 208 may be any controllable conductive device, for example a manual switch or semiconductor device, for example a triac, two anti-parallel SCRs, IGBT, FET, or MOSFET. The auxiliary contactor 208 and the contactor feedback and pre-charge and discharge circuit 210 are coupled in parallel with the main contactor 206. Exemplary contactor feedback and pre-charge and discharge circuits 210 are shown in FIGS. 7–9 as will be discussed in detail below.

The opening and closing of the main contactor 206 and the auxiliary contactor 208 may be controlled by a controller circuit 220. Alternatively, the controller circuit 220 can control the conduction or non-conduction of the semiconductor devices. The load component 226 is disconnected from the power source 202 by opening the main contactor 206 and the auxiliary contactor 208. To energize the load component 226, the controller 220 first closes the auxiliary contactor 208 to pre-charge the capacitive power stage 204 in the load component 226 through the contactor feedback and pre-charge and discharge circuit 210. When the bus voltage $V_{bus}$ is within a predetermined voltage range, $V_{pre}$, of the power supply voltage Vbat, the controller 220 then closes the main contactor 206. The contactor feedback and pre-charge and discharge circuit 210 may also allow the capacitive power stage 204 of the load component 226 to be discharged when the main contactor 206 is open.

Figure 6:
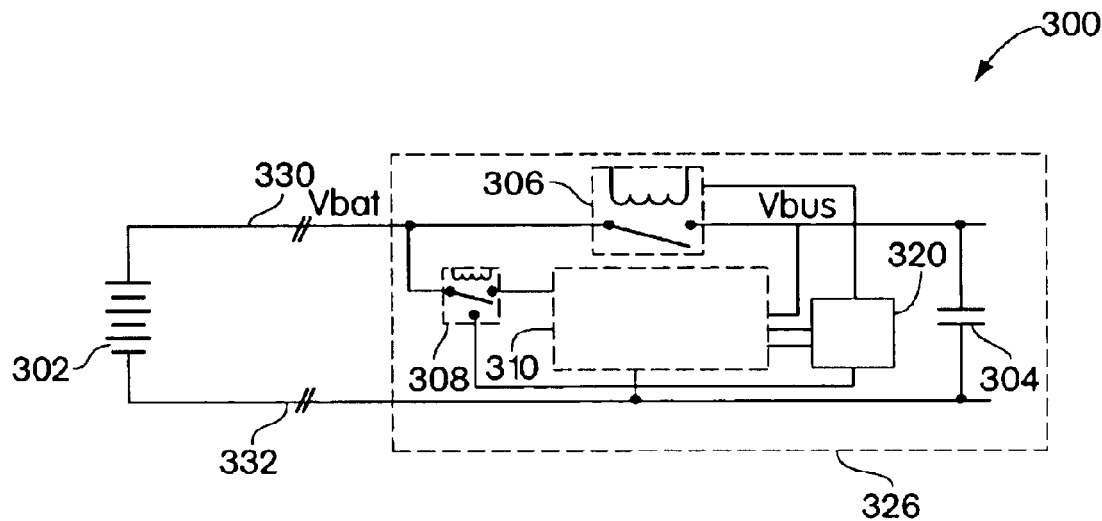
FIG. 6 is a block diagram of a power system with a contactor feedback and precharge and discharge circuit consistent with the present invention integrated within a load component.

FIG. 6 shows a power system 300 comprising a main contactor 306, a contactor feedback and pre-charge and discharge circuit 310, an auxiliary contactor 308, a controller circuit 320, and a capacitive power stage 304 integrated in a load component 326. The load component 326 may be coupled to the power source 302 through conductor 330 and 332. Exemplary contactor feedback and pre-charge and discharge circuits 310 are shown in FIGS. 7–9. If the bus is enclosed inside a component and, hence, is less likely to be touched, then the auxiliary contactor 308 may be removed and replaced by a solid connection.

Figure 7:
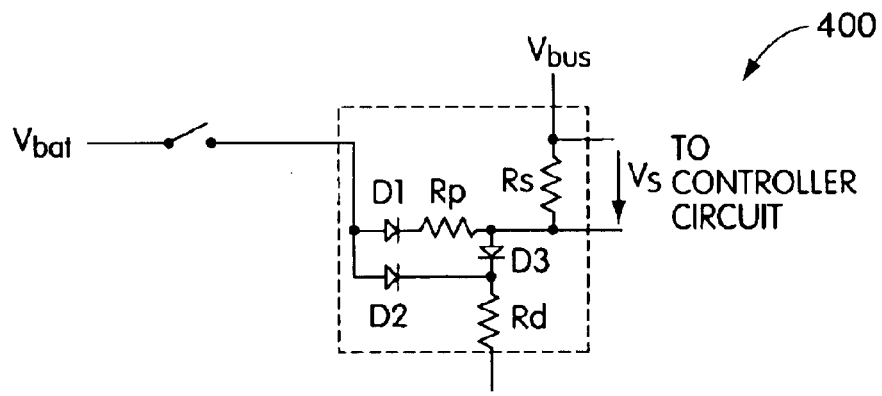
FIG. 7 is an electrical schematic of a first embodiment contactor feedback and pre-charge and discharge circuit consistent with the present invention.

FIG. 7 shows a first embodiment of a contactor feedback and pre-charge and discharge circuit 400 for use in the systems 200 or 300 shown in FIG. 5 and FIG. 6. To initiate the closing of the main contactor 206, 306, the controller circuit 220, 320 first closes auxiliary contactor 208, 308. Current from the power source 202, 302 will charge the capacitive power stage 204, 304 of the load component 226, 326 through D1, $R_p$, $R_S$. The voltage $V_s$ across $R_S$ can be sensed by the controller circuit 220, 320. The voltage $V_s$ will be negative while the capacitive power stage 204, 304 of the load component 226, 326 is charging. When the bus voltage $V_{bus}$ is within a predetermined voltage range, $V_{pre}$, of the power supply voltage $V_{bat}$ (e.g. $V_s$ is less than or equal to $V_{pre}$) it is now safe for the controller circuit 220, 320 to close the main contactor 206, 306. The controller circuit 220, 320 may have some designed in hysteresis to account for minor circuit variations and $V_{pre}$ may not be 0V. Preferably, the predetermined voltage V will be less than 5% of the power supply voltage $V_{bat}$, and more preferably less than 2.5% of the power supply voltage $V_{bat}$.

If the main contactor 206, 306 opens unintentionally during operation of the load component 226, 326, this dangerous condition can be detected by the contactor feedback and pre-charge and discharge circuit 210, 310. If the load continues to consume energy, $V_{bus}$ will decrease and current will flow through D1, $R_p$, and $R_s$ and $V_s$ will become negative and exceed $V_{pre}$. In this case the controller circuit 220, 320 can disable the load component 226, 326 and prevent the main contactor 206, 306 from reclosing before the potentials have been equalized by the contactor feedback and pre-charge and discharge circuit 210, 310. The controller circuit 220, 320 may ensure that the main contactor 206, 306 remains open after the controller circuit 220, 320 detects that the main contactor 206, 306 has unintentionally opened. The controller circuit 220, 320 may ensure that the main contactor 206, 306 remain open until the controller circuit 220, 320 is manually reset using a manual actuator or for a predetermined period of time.

Figure 7A:
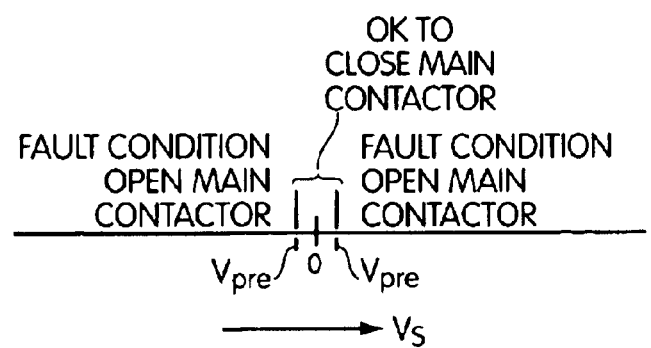
FIG. 7A is a graphical representation of an output of the contactor feedback and FIG. 8 is an electrical schematic of a second embodiment contactor feedback and pre-charge and discharge circuit consistent with the present invention.

If however, the load component 226, 326 had been regenerating power when the main contactor 206, 306 opened, a current will flow through $R_s$, D3, and $R_d$, and $V_s$ will be positive and exceed $V_{pre}$. In this case the controller circuit 220, 320 can disable the load component 226, 326 and prevent the main contactor 206, 306 from reclosing before the potentials have been equalized by the contactor feedback and pre-charge and discharge circuit 210, 310. This is shown graphically in FIG. 7A. For correct operation of the contactor feedback and pre-charge and discharge circuit 400, the auxiliary contactor 208, 308 must remain closed during operation. This may result in a small amount of current flowing through $R_d$.

When the main contactor 206, 306 is opened, a conductive path $R_s$, D3, and $R_d$, allows charge stored in the capacitive power stage 204, 304 of the load component 226, 326 to safely discharge to eliminate the risk of shock due to capacitive charge.

FIG. 8 shows a second embodiment of a contactor feedback and pre-charge and discharge circuit 500. To avoid any unnecessary loses through $R_d$, the resistor $R_d$ of FIG. 7 is replaced by a more "useful" load such as a power-supply circuit U 1'. The power supply circuit U 1' can be enabled or disabled by the controller circuit 220, 320. However, it must remain enabled should the bus be discharged when the main and auxiliary contactors open.

FIG. 9 shows a third embodiment of a contactor feedback and pre-charge circuit 600. The contactor feedback and pre-charge circuit 600 adds an analog to digital converter 640 to the contactor feedback and pre-charge and discharge circuit 500 shown in FIG.8. The A-D converter 640 converts the voltage across $R_s$ to a digital output (On or OFF) that can be coupled to the controller circuit 220, 320 for processing.

Figure 10:
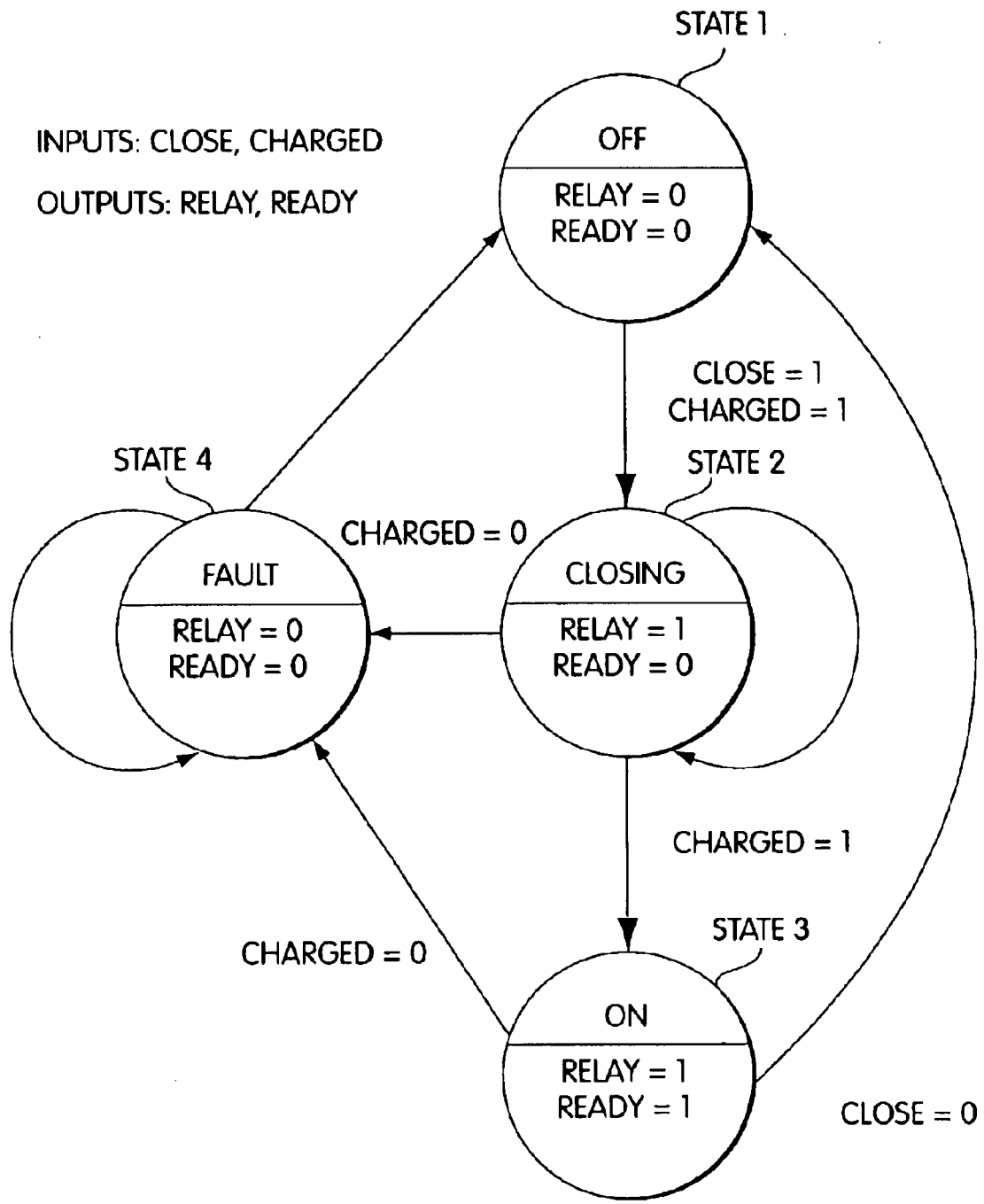
FIG. 10 is a schematic of one embodiment of a finite state machine (FSM) implementing a contactor control-logic for use in the controller circuit of FIGS. 5 and 6.

FIG. 10 shows one embodiment of a finite state machine (FSM) implementing a contactor control-logic for use in the controller circuit of FIGS. 5 and 6. Preferably, the logic is realized either in software or in digital logic, e.g., programmable array logic (PAL) or complex programmable logic device (CPLD). The purpose of the FSM is to close and open a contactor based on a user input ("CLOSE") and based on the output of the "feedback and pre-charge circuit" ("CHARGED", also called "Dout"). The FSM has 4 states:

1) OFF: the contactor is open
2) CLOSING: the contactor is closing (allows for some time to debounce)
3) ON: contactor is closed, load may be enabled
4) FAULT: there is a problem Initially, the contactor is open and the FSM is in state 1. The user may then request the contactor to be closed by asserting "CLOSE". Only if the load is fully precharged (i.e. "CHARGED"=1) the FSM will proceed to state 2 and energize the contactor by means of the "RELAY" signal. The FSM remains in state 2 for a certain amount of time to allow for the de-bouncing of the contactor, and then proceeds to state 3. At this point, the load may be enabled ("READY"=1). The user can then de-assert "CLOSE" in order to open the contactor and the FSM returns to state 1. If during run operation (state 3) the contactor should pop open (for example due to a power supply problem) the "CHARGED" signal will go low and the FSM will immediately switch to state 4 and disable the load and the contactor by de-asserting the signals "READY" and "RELAY". The FSM remains in state 4 for a certain amount of time and then proceeds to state 1. Alternatively, the FSM may remain in state 4 until manually reset.

It should be understood that, while the present invention has been described in detail herein, the invention can be embodied otherwise without departing from the principles thereof, and such other embodiments are meant to come within the scope of the present invention as defined in the following claim(s).

We claim:

1. A circuit for coupling a power source to a load, comprising:
   a main contactor coupled in series with the power source and the load;
   a pre-charge circuit comprising a first conductive path coupled in parallel with the main contactor,
   a discharge circuit comprising a second conductive path coupled in parallel with the load; and
   a controller circuit coupled to the main contactor and to the pre-charge circuit, the controller circuit operative to control the opening of the main contactor based on a current through the first conductive path.

2. The circuit of claim 1, further comprising a controllable element in series with the second path, the controllable element capable of selectively making the second path non-conductive.

3. The circuit of claim 2, wherein the controller circuit controls the state of the controllable element.

4. The circuit of claim 1, wherein the controller circuit comprises
   main contactor controller means for causing the main contactor to close when a voltage drop across a current limiting element in series with the first conductive path is less than or equal to a predetermined value.

5. The circuit of claim 1, wherein the controller circuit comprises
   main contactor control means for causing the main contactor to open when a voltage drop across a current limiting element in series with the first conductive path is greater than a predetermined value.

6. The circuit of claim 1, wherein the second conductive path provides a discharge path to discharge the load when the main contactor is open.

* * * * *